June 23, 1959     R. H. SCHAUPP     2,891,390
COMBINATION ICE BOX AND AIR COOLER FOR AUTOMOBILES
Filed Dec. 3, 1956     2 Sheets-Sheet 1
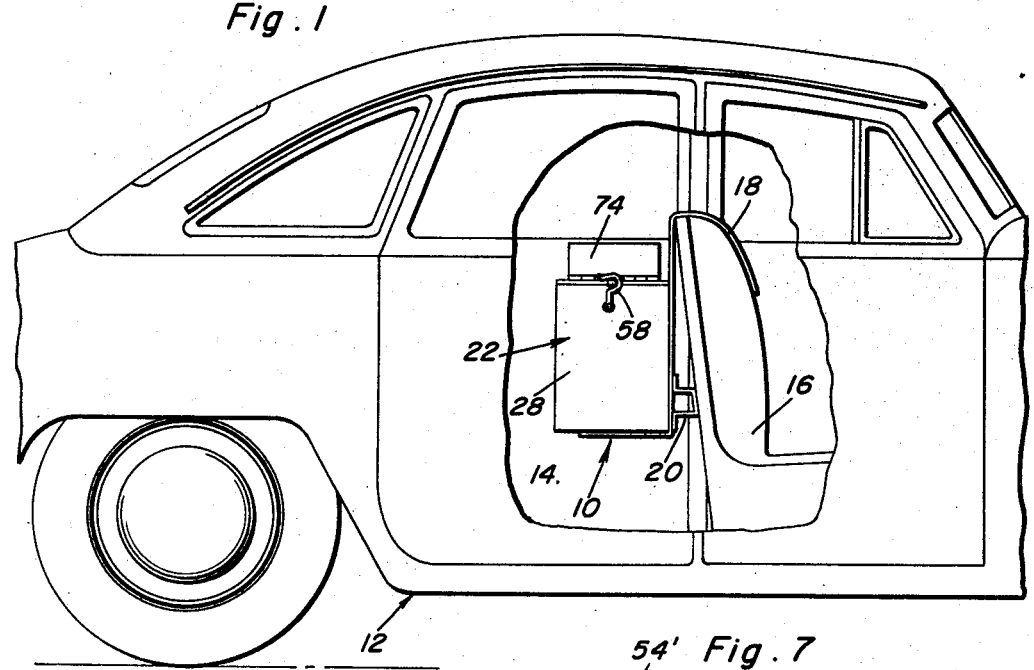
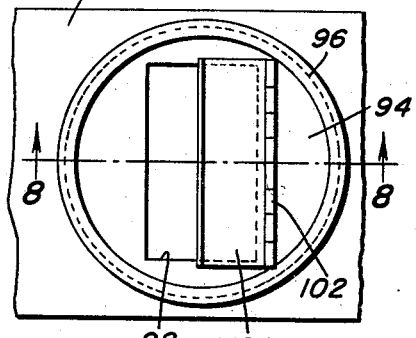
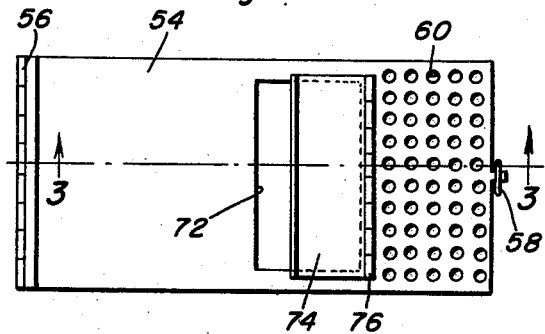
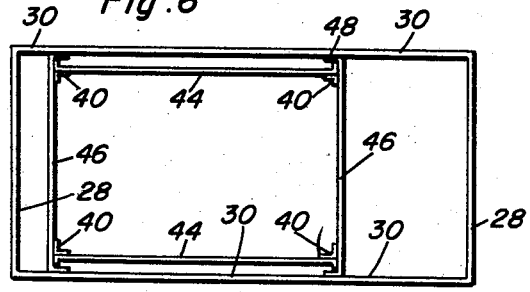
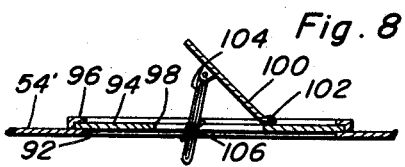
Ralph H. Schaupp
INVENTOR.

June 23, 1959  R. H. SCHAUPP  2,891,390
COMBINATION ICE BOX AND AIR COOLER FOR AUTOMOBILES
Filed Dec. 3, 1956  2 Sheets-Sheet 2

Ralph H. Schaupp
INVENTOR.

United States Patent Office 2,891,390
Patented June 23, 1959

2,891,390

COMBINATION ICE BOX AND AIR COOLER FOR AUTOMOBILES

Ralph H. Schaupp, Indianapolis, Ind.

Application December 3, 1956, Serial No. 625,659

5 Claims. (Cl. 62—312)

The present invention generally relates to a cooling device and more particularly provides a combination ice box and air cooler for automobiles.

An object of the present invention is to provide a device adapted for mounting in the passenger compartment of an automobile in the form of a receptacle having an air fan incorporated therewith for circulating air therethrough over and around a cooling agent such as ice and discharging the same into the passenger compartment in a desired direction for effectively cooling the automobile and at the same time providing an access opening and tray means for positioning in the ice compartment for cooling articles disposed therein, thus providing an efficient ice box and cooler for automobiles.

Another object of the present invention is to provide a combination ice box and air cooler in accordance with the preceding object in which an inner receptacle is provided for the ice and the inner receptacle is spaced from the sides and bottom of the outer receptacle, with the fan being disposed between the receptacles for effectively circulating the air completely about the inner receptacle for efficiently cooling the air.

Yet another object of the present invention is to provide a device in accordance with the preceding objects in which deflector means is provided for deflecting the air into contact with the ice and also a device for absorbing water and further cooling the air by evaporation thereof is provided, as is means for directing the discharge of the air to the desired portion of the passenger compartment.

Other objects of the present invention will reside in its extreme simplicity, ease of assembly in an automobile, efficiency of operation and its adaptation for its particular purposes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of an automobile, with portions thereof broken away, illustrating the combination ice box and cooler of the present invention mounted therein;

Figure 2 is a plan view of the present invention;

Figure 6 is a plan view of the device, with the top and inner receptacle thereof removed;

Figure 7 is a plan view of a modified form of air deflector construction for permitting angular adjustment thereof;

Figure 8 is a vertical sectional view taken substantially upon a plane passing along section line 8—8 of Figure 7, illustrating the details of construction of this form of the invention.

Figure 3:
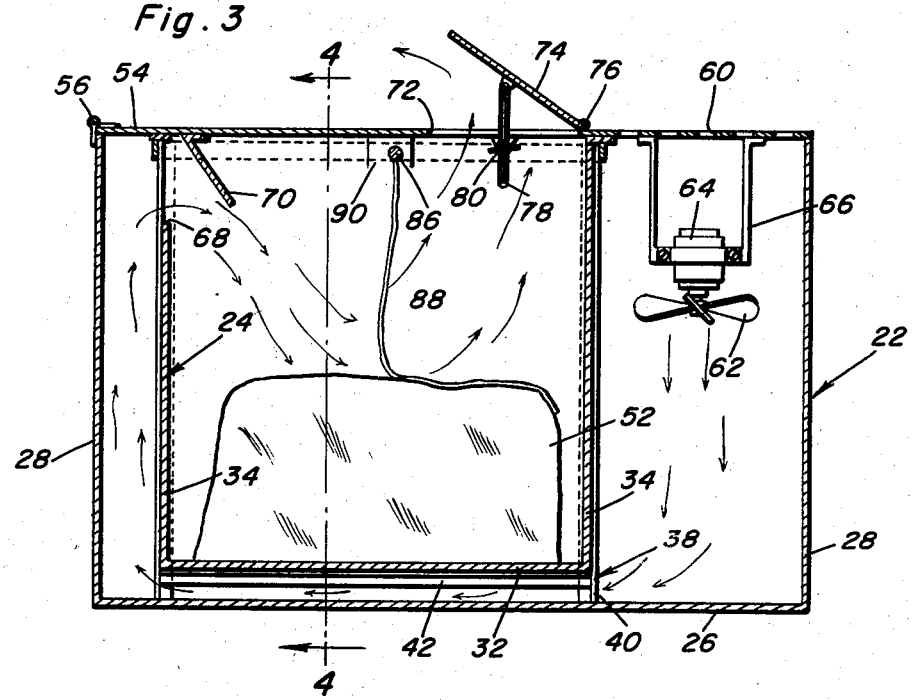
Figure 3 is a longitudinal, vertical sectional view taken substantially upon a plane passing along section line 3—3 of Figure 2, illustrating the details of construction thereof.
Figure 4:
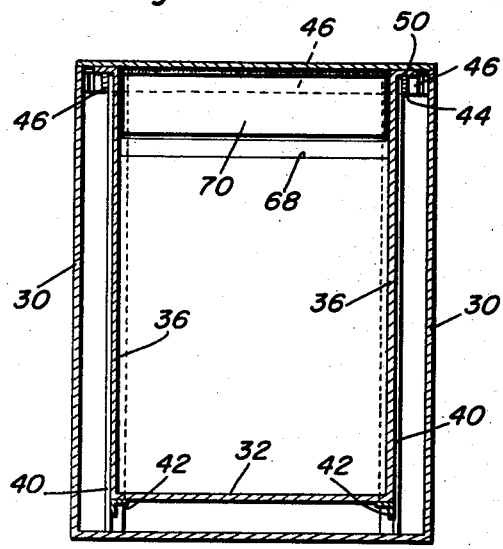
Figure 4 is a transverse, vertical sectional view taken substantially upon a plane passing along section line 4—4 of Figure 3, illustrating further structural details of the present invention.
Figure 5:
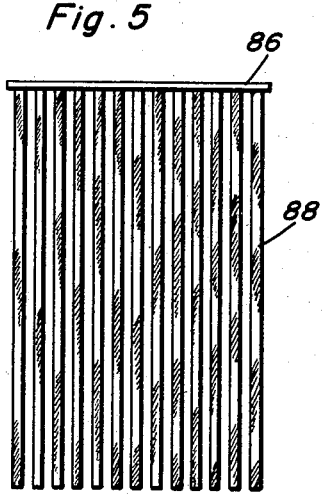
Figure 5 is a plan view of the absorbent member which will maintain moisture in the path of air flow for utilizing the evaporation thereof for cooling the air.
Figure 9:
Figure 9 is a plan view of a tray which may be positioned in the inner receptacle for supporting articles in the ice compartment for cooling thereof.

Referring now specifically to the drawings, the numeral 10 generally designates the combination ice box and car cooler of the present invention for use in conjunction with an automobile generally designated by the numeral 12 which includes the usual passenger compartment 14 and a front seat 16. A pair of supporting hooks 18 may be provided on the device 10 for engagement over the top edge of the front seat 16, thus supporting the device to the rear of the front seat 16, and spacers 20 may be provided adjacent the bottom thereof for engagement with the rear of the front seat 16, thus supporting the combination ice box and cooler 10 from the rear of the front seat 16 so that the device will not interfere with the driver or passenger in the front seat of the automobile 12.

The device 10 generally includes an outer receptacle generally designated by the numeral 22 and an inner receptacle generally designated by the numeral 24. The outer receptacle 22 includes a bottom 26, end walls 28 and side walls 30. The inner receptacle 24 includes a bottom wall 32, end walls 34 and side walls 36, all of which are disposed in spaced parallel relation to the respective walls of the outer receptacle 22. A spacing framework generally designated by the numeral 38 supports the inner receptacle 24 in the outer receptacle 22.

The framework 38 includes vertical, upstanding corner angle-irons 40 which are interconnected by horizontal, bottom corner angle-irons 42, thus forming a skeleton frame for receiving the inner receptacle 24 and spacing the same completely from the outer receptacle 22.

The upper ends of the corner posts 40 are interconnected by longitudinal members 44 along the side thereof and transverse members 46 which extend beyond the corner members 40 and terminate in laterally extending ends 48 for engaging the inner surface of the side walls 30 of the outer receptacle 22, thus securely maintaining the framework and inner receptacle 24 in spaced relation to the outer receptacle 22. The inner receptacle 24 is provided with an outwardly extending, peripheral flange 50 for resting upon the top edge of the framework 38, whereby the inner receptacle 24 forms an ice receptacle for receiving a block of ice 52.

An enlarged closure plate 54 is provided for the open top of the outer receptacle 22 and is hingedly connected thereto at one end by hinge means 56 and latch means 58 is provided at the other end thereof for retaining the closure plate 54 in closed position and for providing access to the interior of the compartments 22 and 24. The end of the closure plate 54 remote from the hinge 56 is provided with a plurality of openings 60 forming air inlet openings, with a fan 62 being disposed therebelow. The fan 62 is supported and driven by a suitable electric motor 64 supported by the depending bracket members 66 from the undersurface of the top or closure plate 54 for circulating air downwardly around and under the receptacle 24.

The end wall 34 of the receptacle 24 remote from the fan 62 is provided with a transversely extending, enlarged opening 68 adjacent the juncture with the closure top 54 for permitting air to pass into the interior of the inner receptacle 24. A downwardly and inwardly inclined baffle plate 70 is rigidly secured to the undersurface of the closure top 54 and extends in acute angular relation to the plane of the opening 68, whereby air entering the opening 68 will engage the deflector plate 70 and will be urged downwardly into surface contact with and around the block of ice 52.

An enlarged discharge opening 72 is provided in the closure plate 54 adjacent the edge of the inner receptacle 24 remote from the opening 68 whereby air may be discharged into the interior of the automobile 12. The opening 72 is provided with a deflector plate 74 hingedly connected to one edge of the opening by hinge means 76 and adjustable brace means 78 in the form of a slotted brace and a suitable clamp bolt 80, thus varying the angular position of the deflector plate 74 and deflecting the cooled air in such a manner that it will be discharged from the cooler in any suitable direction.

The electric motor 64 may be driven from any suitable source, such as the storage battery of the automotive vehicle. The supply of ice 52 may be replenished when necessary and varying combinations of ice and water may be provided. A rectangular wire tray 82 is provided with projecting pegs 84, thus providing a wire supporting tray which may be disposed within the inner receptacle 24 at any desired height by employing a series of openings if desired, thus forming a tray for articles to be cooled, thus as soft drinks, sandwiches or the like, thus providing a combination ice box and air cooler.

To render the device more efficient, a transverse rod 86 having a plurality of depending, flexible absorbent members 88 is supported from a pair of slotted brackets 90 on the inner receptacle 24 and is provided for conveying water by capillary action into the path of movement of the air, thus further cooling the air by the evaporative action of the air on the water and by physical cooling of air by contact with cool water.

The arrangement as illustrated in Figure 3 is such that the inner receptacle 24 is disposed closer to one end wall 28 of the outer receptacle 22 than the other, thus providing adequate room for the fan 62. An exemplary size of the outer receptacle or container should be about twelve inches wide, twenty-four inches long and sixteen to eighteen inches high, with the inner receptacle being approximately one inch from the side walls and bottom and two inches from the end opposite the fan and about seven inches from the end which will contain the fan. These limitations are not to be construed as being restrictive but merely as being illustrative of the shape, size and proportions of the device.

The baffle 70 has been illustrated as being on the lid, but it is pointed out that it may also be attached to either the outer or inner receptacle, but the lid is preferable since it provides for a completely open inner receptacle when the lid or closure 54 is lifted. Also, the fan is shown attached to the lid, but it may also be attached to the outer receptacle 22, and in either case would direct the air downwardly through the openings 60 and around the inner receptacle 24 and thus into the interior of the inner receptacle 24 and deflected downwardly into engagement with the ice 52 and then through the evaporative absorbent members 88 and out through the discharge opening 72.

Figures 7 and 8 illustrate the closure lid 54' having an enlarged opening 92, with a circular closure plate 94 disposed therein and retained thereon for rotation about a vertical axis by a retaining flange 96. The plate 94 is provided with a discharge opening 98 having a deflector baffle plate 100 hingedly attached to one edge thereof by means 102 and adjusted in angular position by a slotted brace 104 and complementary clamp screw means 106, whereby the angle of the defletcor plate 100 may be adjusted and the position of the deflector 100 about a vertical axis may be changed by rotating the plate 94 within the retaining flange 96, thus providing a deflector means for discharging the air in a desired direction.

The wire trays 82 having the hooks 84 thereon are adapted to extend across the top and hook on the sides of the inner receptacle. The purpose of these trays is primarily to hold articles for cooling and also provides for the possible use of dry ice or pre-frozen containers, thus adding to the cooling effect of the device and also rendering the device more utilitarian for cooling of the desired articles and also for maintaining the desired temperature differential.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A combination ice box and air cooler comprising an outer parallelopiped receptacle, an inner parallelopiped receptacle disposed within said outer receptacle, frame means for supporting the inner receptacle in spaced relation to the outer receptacle and permitting air passage therebetween, fan means for circulating air between the inner and outer receptacles, said inner receptacle having an opening in a vertical wall thereof remote from said fan means, deflector means inclined inwardly of said opening for deflecting air downwardly into the interior of the inner receptacle, a closure lid for said inner and outer receptacles, said closure lid having a discharge opening in alignment with the interior of the inner receptacle whereby air may be discharged therefrom from the interior of the inner receptacle, said inner receptacle adapted to receive a cooling medium for cooling air passing around the walls of the inner receptacle and over the cooling medium, said deflector directing the air into surface contact with the cooling medium, and a wire tray provided with upwardly extending hook members for engagement over the edge of the inner receptacle for providing a tray within the inner receptacle for supporting articles to be cooled, thus providing a combination ice box and cooler.

2. A combination ice box and air cooler comprising an outer parallelopiped receptacle, an inner parallelopiped receptacle disposed within said outer receptacle, frame means for supporting the inner receptacle in spaced relation to the outer receptacle and permitting air passage therebetween, fan means for circulating air between the inner and outer receptacles, said inner receptacle having an opening in a vertical wall thereof remote from said fan means, deflector means inclined inwardly of said opening for deflecting air downwardly into the interior of the inner receptacle, a closure lid for said inner and outer receptacles, said closure lid having a discharge opening in alignment with the interior of the inner receptacle whereby air may be discharged therefrom from the interior of the inner receptacle, said inner receptacle adapted to receive a cooling medium for cooling air passing around the walls of the inner receptacle and over the cooling medium, said deflector directing the air into surface contact with the cooling medium, said inner receptacle being provided with a transverse rod adjacent the upper edge thereof, a plurality of flexible strips of absorbent material extending downwardly and toward the bottom of the inner receptacle for engagement with a liquid cooling medium whereby the liquid cooling medium will be elevated into the path of movement of the air whereby evaporation of the cooling medium will also cool the air.

3. A combination ice box and air cooler comprising an outer parallelopiped receptacle, an inner parallelopiped receptacle disposed within said outer receptacle, frame means for supporting the inner receptacle in spaced relation to the outer receptacle and permitting air passage therebetween, fan means for circulating air between the inner and outer receptacles, said inner receptacle having an opening in a vertical wall thereof remote from said fan means, deflector means inclined inwardly of said opening for deflecting air downwardly into the interior of the inner receptacle, a closure lid for said inner and outer receptacles, said closure lid having a discharge opening in alignment with the interior of the inner receptacle whereby air may be discharged therefrom from the interior of the inner receptacle, said inner receptacle adapted to receive a cooling medium for cooling air passing around the walls of the inner receptacle and over the cooling medium, said deflector directing the air into surface contact with the cooling medium, said closure lid being provided with a rotatable plate having the discharge opening disposed in the rotatable plate, a deflector plate adjustably disposed over said discharge opening whereby the plane of the plate may be adjusted about a vertical axis, and mounting means for the deflector plate for angular adjustment thereof about a horizontal axis thus deflecting the cooled air to the desired area of the interior of an automobile.

4. A combination ice box and air cooler comprising an outer parallelopiped receptacle, an inner parallelopiped receptacle disposed within said outer receptacle, frame means for supporting the inner receptacle in spaced relation to the outer receptacle and permitting air passage therebetween, fan means for circulating air between the inner and outer receptacles, said inner receptacle having an opening in a vertical wall thereof remote from said fan means, deflector means inclined inwardly of said opening for deflecting air downwardly into the interior of the inner receptacle, a closure lid for said inner and outer receptacles, said closure lid having a discharge opening in alignment with the interior of the inner receptacle whereby air may be discharged therefrom from the interior of the inner receptacle, said inner receptacle adapted to receive a cooling medium for cooling air passing around the walls of the inner receptacle and over the cooling medium, said deflector means directing the air into surface contact with the cooling medium.

5. A combination ice box and air cooler comprising an outer receptacle, an inner receptacle disposed within said outer receptacle, means supporting the inner receptacle in spaced relation to the outer receptacle and providing an air passage therebetween, fan means for circulating air between the inner and outer receptacles, said inner receptacle having an opening in a vertical wall thereof remote from said fan means, deflector means for deflecting air downwardly into the interior of the inner receptacle, a closure lid for said inner and outer receptacles, said closure lid having a discharge opening in alignment with the interior of the inner receptacle whereby air may be discharged from the interior of the inner receptacle, said inner receptacle adapted to receive a cooling medium for cooling air passing around the walls of the inner receptacle and over the cooling medium, said deflector means directing the air into surface contact with the cooling medium.

References Cited in the file of this patent

UNITED STATES PATENTS

| | | |
|---|---|---|
| 2,060,482 | Ballman | Nov. 10, 1936 |
| 2,522,623 | Likes et al. | Sept. 19, 1950 |